Dec. 17, 1957     F. UNGERER     2,816,644
CONVEYING MEANS OF A CUTTING AND FINISHING
PLANT FOR METAL SHEETS
Filed Jan. 11, 1954     2 Sheets-Sheet 1

INVENTOR
FRITZ UNGERER
BY:

Dec. 17, 1957     F. UNGERER     2,816,644
CONVEYING MEANS OF A CUTTING AND FINISHING
PLANT FOR METAL SHEETS
Filed Jan. 11, 1954     2 Sheets-Sheet 2

INVENTOR
FRITZ UNGERER
BY:

[United States Patent Office — 2,816,644 — Patented Dec. 17, 1957]

2,816,644

CONVEYING MEANS OF A CUTTING AND FINISHING PLANT FOR METAL SHEETS

Fritz Ungerer, Pforzheim, Germany

Application January 11, 1954, Serial No. 403,316

Claims priority, application Germany January 16, 1953

3 Claims. (Cl. 198—21)

The present invention relates to a cutting and finishing plant for sheet metal, and is particularly directed to those conveying means of the plant which take the metal sheets out of the conveying direction of the plant.

In a manufacturing plant of this type the sheet metal has to pass successively the following kinds of devices: A machine which passes the rolled up bands of sheet metal successively on to, a delivery reel from which the sheet metal is then reeled off, a preliminary straightening machine, a machine for trimming or cutting off the longitudinal edges of the sheet metal band, a shearing machine, a roller table, a turning device, a device for measuring the thickness of the sheet metal, a storing device for faulty metal sheets, another roller table, a greasing machine, and a storing device for finished metal sheets.

As already mentioned, the invention relates particularly to those conveying means of this plurality of plant units, which take the sheet metal out of the conveying direction, viz. the turning device, and the storing devices.

The turning device serves the purpose of turning the metal sheets through an angle of 180°, and thereby enables the inspection of both sides of the sheets for the detection of possible defects, while the storing devices store the metal sheets of one kind up in piles.

These particular types of conveying means of the invention consist of a plurality of coaxially mounted turnstiles, and the metal sheets to be handled are automatically fed onto the parallel supporting arms of these turnstiles.

In the turning device, the metal sheets are turned through an angle of 180° through rotation of the turnstiles. In the storing device, two sets of coaxially mounted turnstiles are arranged parallel to each other, and the metal sheets drop, after rotation of the supporting arms of the turnstiles through an angle of 90° in clockwise and anti-clockwise direction, vertically down upon the pile. The turning device is further provided between the turnstiles, on the inlet side as well as on the exit side of the metal sheets, with a plurality of rollers for the transport of the metal sheets into and out of the device, which rollers are stationarily mounted in the device, and not turned together with the metal sheets. The starting switch, by means of which the metal sheets fed into the turning device themselves automatically start the turning movement of the turnstiles, is positioned at the extreme end of the inlet side of the device.

It is understood that every group of supporting arms of the turnstiles can handle only one metal sheet at a time. As the metal sheets, when the plant is in operation, are travelling behind each other with only small intervals between the individual sheets, provision must be made that successive sheets are each time fed onto a different group of supporting arms or spokes of the turnstiles or turning wheels. For this purpose the invention provides the conveying plant with roller tables, arranged before the turning device and before the storing device, and which convey the metal sheets at an increased speed, and thereby enlarge the distance between the individual sheets to such an extent that every sheet is fed onto a different group of supporting arms.

Cutting and finishing plants for sheet metal must be able to attend to any customary size or length of metal sheets reeled off the wound-up sheet metal band. That is why also the aforedescribed turning and storing means must be so devised that they are capable of handling even the longest metal sheets which may be needed by the trade.

In a plant designed for the handling of long metal sheets the distances produced on the roller table between the individual metal sheets are too small for the handling of short metal sheets. The consequence is that the next following metal sheet reaches the inlet end of the turning or storing device already before the preceding metal sheet has been able to pass through the turning or storing device and actuate the actuating contact at the end of the inlet side. In order to enlarge the distance between the metal sheets, it would be possible to increase either the length of the roller table, or the speed of the rollers of the roller table. However, an increase of the length of the roller table would make the plant still more voluminous and unwieldly, while an increase of the speed of rotation of the rollers would feed the metal sheets onto the inlet end with such comparative force that their front edges might get injured by it.

The invention solves this problem in a very simple and efficient manner by subdividing the turning and storing means into a plurality of operating sections, of this plurality of successive sets or groups of supporting arms, the invention provides only the last one of these groups with actuating means, while the other groups of supporting arms, positioned between the last group and the inlet end of the device, are adapted for being coupled to the last group according to requirements. Hence, when metal sheets of shortest size have to be handled, they have to pass several idle groups of supporting arms before they get onto the last active group of supporting arms. It is of no importance, therefore, when the next following metal sheets reaches the inlet end of the turning or storing device before the active group of supporting arms is capable of handling it.

Additional features and advantages of the invention will be understood from a consideration of the following detailed description taken in connection with the accompanying drawings, forming a part of this specification, and in which an embodiment of the invention has been shown by way of illustration. However, I wish to say that the invention is not confined to any strict conformity with the showing of the drawings, but may be changed or modified, so long as such changes of modifications mark no material departure from the salient features of the invention as expressed in the appended claims.

In the drawings, in which like parts are referred to by the same reference numerals, Fig. 1 is a side view of a turning device according to the present invention;

Figure 3:
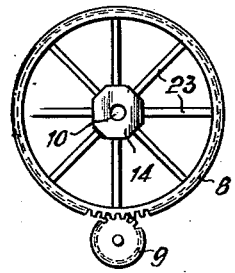
Fig. 3 is a front view of a turnstile means according to the present invention.
Figure 5:
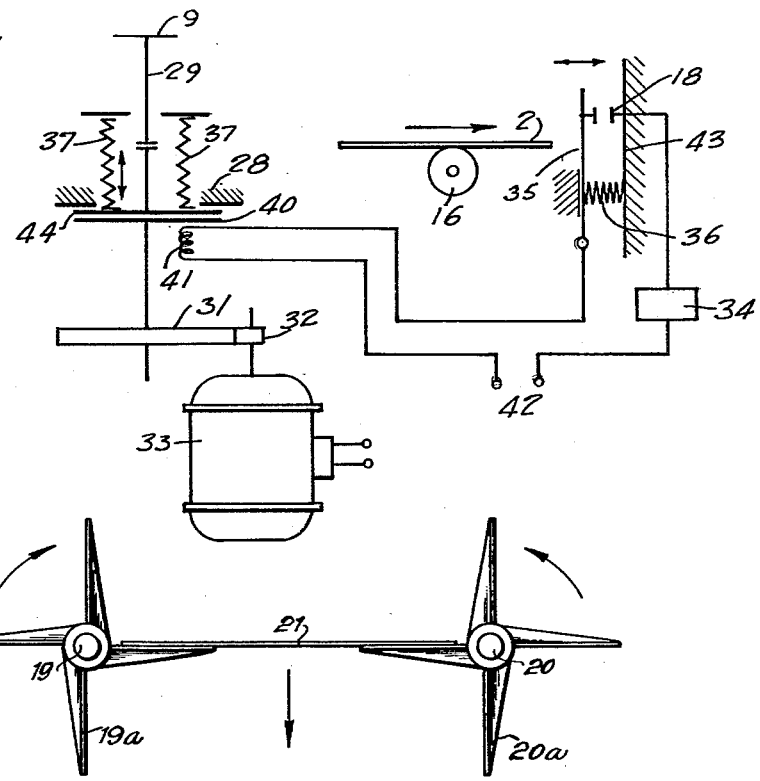
Fig. 5 is a diagram showing the electric circuit employed in the embodiment of Fig. 2.

Referring now to the drawings, the metal sheets 1 are conveyed on the roller table 2 at an increasing speed, and thus arrive on the inlet side 3 of the sheet turning device. A plurality of rotating, but stationarily mounted rollers 16 are arranged between a plurality of turnstile means 4, 5, 6 and 7 whose spokes or arms 23 connect the hubs 11, 12, 13 and 14, respectively with the rims 8 of the wheels 4, 5, 6 and 7 as shown in Fig. 3. A shaft 10 supports the hubs of the turnstile means for rotation. The last turnstile means in feeding direction, namely the turnstile means 7 which has the hub 14, is provided with gear teeth along its rim 8. A smaller gear 9 meshes with the gear teeth of the turnstile means 7 and drives the same. The arms 23 of adjacent pairs of turnstile means 4—5, 5—6, and 6—7 can be coupled to each other by bolts 38, see Fig. 6, and such bolts may also be used for locking the turnstiles against rotation. Contact means 18 are provided, and actuation of the contact means effects turning of the turnstile means 7. As shown in Fig. 5, the gear 9 is mounted on the shaft 29 which is driven through gear means 31 and 32 by a motor 33. Electromagnetic coupling means 40, 44 is arranged between the gear 9 and the gear 31. The coupling 40, 44 is operated by the electromagnetic coil 41 which is connected in a circuit containing the switch 18 and a time relay 34. A source of current is connected to the terminals 42.

When a sheet 1, conveyed by rollers 16, engages the movable arm 35 of the switch 18, the contacts close and a current flows through the coil 41 whereby the coupling 40, 44 is moved to a coupling position so that the gear 9 is rotated by the motor 33. After a predetermined time, the time relay 34 interrupts the circuit so that the spring means 37 moves the coupling 40, 44 to a disengaged position whereby the gear 9 is disconnected from the drive motor 33. The springs 37 also press the movable part of the coupling 44 against a brake surface 28 whereby the gear 9 is immediately stopped. The arrangement is such that the turnstile means 7 is stopped in the desired position. The rotating turnstile means 7 turns the metal sheets supported thereon through an angle of 180° and places them upon the conveying roller 15 which conveys the reversed sheets further to rollers 15a.

Figure 6:
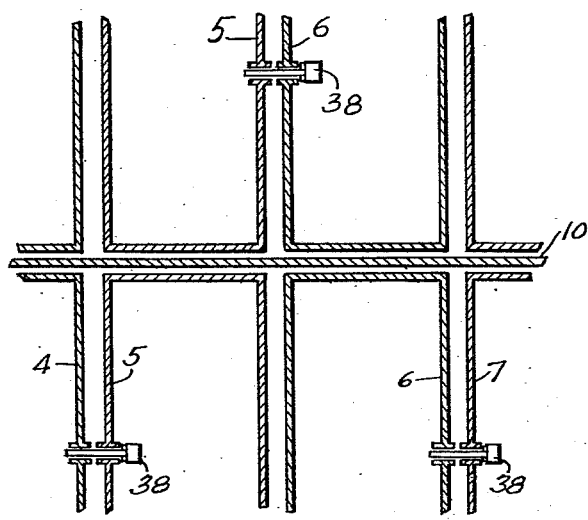
Fig. 6 is a fragmentary schematic cross section of the turning device shown in Fig. 2 illustrating the coupling between two adjacent turnstile means.

For turning of metal sheets of short length only rotation of the turnstile means 7 is necessary. If longer sheets are to be turned and reversed, the turnstile means 13, 6 is coupled to the turnstile means 7 by bolts 38 as shown in Fig. 6. When the sheets are even longer, further turnstile means are connected in the same manner to the driven turnstile means 7 so that even the longest sheets can be reversed and placed on the rollers 15 by which such sheets are further conveyed to the rollers 15a.

Figure 1:
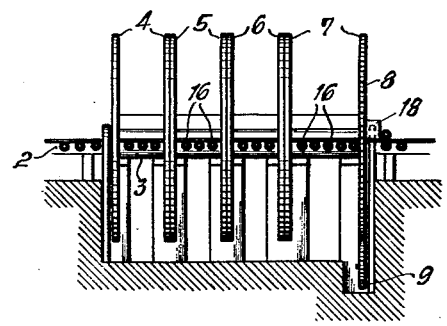
Figure 2:
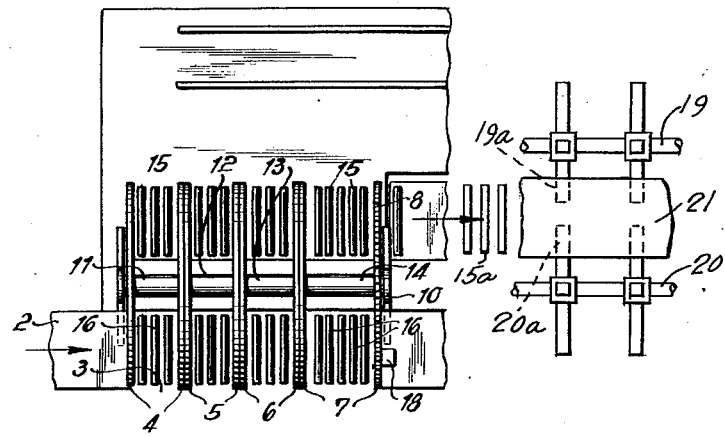
Fig. 2 is a top view of a turning device and of a stacking device according to the present invention.
Figure 4:
Fig. 4 is a front view of a stacking device.

A stacking device according to the present invention is shown in Fig. 2 adjacent to the reversing turnstile device. The stacking device according to the present invention is also shown in Fig. 4, and comprises two sets of turnstile means having shafts 19 and 20. Shafts 19 and 20 are parallel to the direction of feeding of the sheets. Arms 19a and 20a receive the sheet from rollers 15a, and simultaneous turning of the respective supporting arms 19a and 20a through an angle of 90° toward each other causes dropping of the successively received sheets onto a stack 22.

What I claim as new and desire to secure by Letters Patent of the United States is:

1. A conveying arrangement comprising, in combination, conveying means for conveying metal sheets in a feeding direction along a conveying path; a plurality of turnstile means rotatable about a common axis extending parallel to said conveying path, each turnstile means having a plurality of radially extending arm means and being turnable from a position of rest in which one of said arm means is located in said conveying path to at least one angularly displaced position, said turnstile means in said position of rest being adapted to support metal sheets conveyed by said conveying means along said conveying path; drive means for turning the turnstile means last in said feeding direction and adapted to be actuated by a sheet supported on said arm means of said last turnstile means whereby said last-mentioned sheet is transversely moved away from said conveying path; and means for turning the other turnstiles means together with said last turnstile means for transversely moving sheets having a length greater than the axial length of said last turnstile means.

2. A conveying arrangement comprising, in combination, conveying means for conveying metal sheets in a feeding direction along a conveying path; a plurality of turnstile means rotatable about a common axis extending parallel to said conveying path, each turnstile means having a plurality of radially extending arm means and being turnable from a position of rest in which one of said arm means is located in said conveying path to at least one angularly displaced position, said turnstile means in said position of rest being adapted to support metal sheets conveyed by said conveying means along said conveying path; drive means for turning the turnstile means last in said feeding direction and adapted to be actuated by a sheet supported on said arm means of said last turnstile means whereby said last-mentioned sheet is transversely moved away from said conveying path; and coupling means for connecting the other turnstile means of said set of turnstile means to said last turnstile means for turning the other turnstile means together with said last turnstile means for transversely moving sheets having a length greater than the axial length of said last turnstile means.

3. A conveying arrangement comprising, in combination, conveying means for conveying metal sheets in a feeding direction along a conveying path; two sets of turnstile means, each set of turnstile means rotatable about a common axis extending parallel to said conveying path and to the other axis, each turnstile means having a plurality of radially extending arm means and being turnable from a position of rest in which one of said arm means is located in said conveying path to at least one angularly displaced position, said turnstile means in said position of rest being adapted to support metal sheets conveyed by said conveying means along said conveying path; drive means for turning the turnstile means last in said feeding direction and adapted to be actuated by a sheet supported on said arm means of said last turnstile means whereby said last-mentioned sheet is transversely moved away from said conveying path; and means for turning the other turnstile means together with said last turnstile means for transversely moving sheets having a length greater than the axial length of said last turnstile means.

References Cited in the file of this patent
UNITED STATES PATENTS

| | | |
|---|---|---|
| 1,298,828 | Todhunter | Apr. 1, 1919 |
| 1,970,749 | Heichert | Aug. 21, 1934 |
| 2,176,761 | Fisher | Oct. 17, 1939 |
| 2,664,992 | Bahney | Jan. 5, 1954 |